United States Patent
Hooton et al.

(10) Patent No.: US 12,194,827 B2
(45) Date of Patent: Jan. 14, 2025

(54) INTEGRATED ELECTRIFIED PROPULSION SYSTEM FOR A VEHICLE

(71) Applicant: GM GLOBAL TECHNOLOGY OPERATIONS LLC, Detroit, MI (US)

(72) Inventors: Joel S. Hooton, Chesterfield, MI (US); Brian V. Castillo, Birmingham, MI (US); Joseph D. Kliewer, Bloomfield Hills, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 309 days.

(21) Appl. No.: 17/859,239

(22) Filed: Jul. 7, 2022

(65) Prior Publication Data

US 2024/0010062 A1 Jan. 11, 2024

(51) Int. Cl.

| | |
|---|---|
| B60K 1/04 | (2019.01) |
| B60K 11/04 | (2006.01) |
| B60K 17/28 | (2006.01) |
| B60L 1/00 | (2006.01) |
| B60L 53/20 | (2019.01) |
| F16H 57/021 | (2012.01) |
| F16H 57/04 | (2010.01) |
| B60K 1/00 | (2006.01) |
| F16H 57/02 | (2012.01) |

(52) U.S. Cl.
CPC ............... *B60K 1/04* (2013.01); *B60K 11/04* (2013.01); *B60K 17/28* (2013.01); *B60L 1/003* (2013.01); *B60L 53/20* (2019.02); *F16H 57/021* (2013.01); *F16H 57/0415* (2013.01); *B60K 2001/005* (2013.01); *B60K 2001/006* (2013.01); *F16H 2057/02034* (2013.01); *F16H 2057/02043* (2013.01)

(58) Field of Classification Search
CPC .......... B60K 1/04; B60K 11/04; B60K 17/28; B60K 2001/005; B60K 2001/006; B60L 1/003; B60L 53/20; F16H 57/021; F16H 57/0415; F16H 2057/02034; F16H 2057/02043
See application file for complete search history.

(56) References Cited

U.S. PATENT DOCUMENTS

| | | | |
|---|---|---|---|
| 9,630,524 B1* | 4/2017 | Conde | B60K 17/04 |
| 10,486,690 B2* | 11/2019 | Colavincenzo | B60K 6/48 |
| 11,364,959 B1* | 6/2022 | Boe | B62D 55/10 |
| 2010/0025131 A1* | 2/2010 | Gloceri | B60K 6/52 |
| | | | 180/65.265 |
| 2015/0087474 A1* | 3/2015 | Matsubara | B60K 6/365 |
| | | | 477/3 |
| 2016/0068072 A1* | 3/2016 | Fan | H02K 7/10 |
| | | | 180/55 |
| 2019/0078666 A1* | 3/2019 | Duhaime | B60K 17/28 |
| 2020/0031420 A1* | 1/2020 | Aunkst | B62M 7/04 |

\* cited by examiner

*Primary Examiner* — Erez Gurari
(74) *Attorney, Agent, or Firm* — Quinn IP Law

(57) ABSTRACT

An integrated electrified propulsion system for a vehicle includes a single electric machine, a mechanical geartrain, a rechargeable energy storage device, an integrated cooling system, and a power electronics system. The single electric machine, the mechanical geartrain, the integrated cooling system, the rechargeable energy storage device, and the power electronics system are arranged in a single housing. The single electric machine is rotatably coupled to the mechanical geartrain to transfer mechanical power therebetween.

20 Claims, 4 Drawing Sheets

INTEGRATED ELECTRIFIED PROPULSION SYSTEM FOR A VEHICLE

INTRODUCTION

Incorporating an electrified propulsion system to a vehicle may add mass and increase system complexity.

SUMMARY

The concepts described herein are systems and apparatuses related to an integrated electrified vehicle propulsion system (IEPS) that may be integrated onto a vehicle chassis in a manner that may reduce mass, may reduce system complexity, may increase reliability, and may improve acceptability of EV system.

An aspect of the disclosure may include an integrated electrified propulsion system for a vehicle that includes a single electric machine, a mechanical geartrain, a rechargeable energy storage device, an integrated cooling system, and a power electronics system. The single electric machine, the mechanical geartrain, the integrated cooling system, the rechargeable energy storage device, and the power electronics system are arranged in a single housing.

Another aspect of the disclosure may include the single electric machine being rotatably coupled to the mechanical geartrain to transfer mechanical power therebetween.

Another aspect of the disclosure may include the mechanical geartrain being a torque transmission device coupled to a plurality of power takeoff couplers via a plurality of shaft members.

Another aspect of the disclosure may include the plurality of shaft members being a first shaft member and a second shaft member, wherein the first and second shaft members are arranged perpendicular to a longitudinal axis of the single housing, wherein a first of the plurality of power takeoff couplers is arranged on a first side of the single housing and is rotatably coupled to the first shaft member, and wherein a second of the plurality of power takeoff couplers is arranged on a second side of the single housing that is opposite to the first side perpendicular to the longitudinal axis, and is rotatably coupled to the second shaft member.

Another aspect of the disclosure may include the plurality of shaft members includes a first shaft member and a second shaft member, wherein the first and second shaft members are arranged parallel to a longitudinal axis of the single housing, wherein a first of the plurality of power takeoff couplers is arranged on a first end of the single housing and is rotatably coupled to the first shaft member, and wherein a second of the plurality of power takeoff couplers is arranged on a second end of the single housing that is opposite to the first end along the longitudinal axis, and is rotatably coupled to the second shaft member.

Another aspect of the disclosure may include the first shaft member and the second shaft member being collinear, and being collinear with a centerline of the single housing.

Another aspect of the disclosure may include the first shaft member and the second shaft member being collinear, and being laterally offset from a centerline of the single housing.

Another aspect of the disclosure may include the plurality of shaft members including a third shaft member that is arranged perpendicular to the longitudinal axis, wherein a third of the plurality of power takeoff couplers is arranged on a first side of the single housing, and wherein the third of the plurality of power takeoff couplers is rotatably coupled the third shaft member.

Another aspect of the disclosure may include the first shaft member and the second shaft member being collinear, and being collinear with a centerline of the single housing.

Another aspect of the disclosure may include the first shaft member and the second shaft member being collinear, and being laterally offset from a centerline of the single housing.

Another aspect of the disclosure may include the single electric machine being a multi-phase rotary electric motor/generator.

Another aspect of the disclosure may include the power electronics system being an electric power inverter, an auxiliary power module, an accessory electric motor, an electric charge manager, and a power electronics controller.

Another aspect of the disclosure may include the power electronics controller being operatively connected to the electric power inverter, and wherein the electric power inverter is configured to transfer electric power between the single electric machine and the rechargeable energy storage device.

Another aspect of the disclosure may include the accessory electric motor coupled to an air-conditioning (AC) compressor.

Another aspect of the disclosure may include a high-voltage power bus, wherein the high-voltage power bus is configured to transfer electric power between the rechargeable energy storage device and the power electronics system.

Another aspect of the disclosure may include the rechargeable energy storage device being disposed in a separate battery housing that is arranged within the single housing.

Another aspect of the disclosure may include the integrated cooling system having a fluidic circuit that is thermally coupled to at least one of the single electric machine, the mechanical geartrain, the rechargeable energy storage device, and the power electronics system via a plurality of fluidic heat exchange devices.

Another aspect of the disclosure may include an electrified vehicle that may include a chassis, a radiator, a driveline coupled to a drive member, a charger port, and an integrated electrified propulsion module, wherein the integrated electrified propulsion system is assembled into the chassis. The integrated electrified propulsion system may include a single electric machine, a mechanical geartrain, a rechargeable energy storage device, an integrated cooling system, and a power electronics system, wherein the single electric machine, the mechanical geartrain, the integrated cooling system, the rechargeable energy storage device, and the power electronics system are arranged in a single housing. The single electric machine is rotatably coupled to the mechanical geartrain to transfer mechanical power therebetween. The mechanical geartrain comprises a torque transmission device coupled to a plurality of power takeoff couplers via a plurality of shaft members. The driveline is mechanically coupled to the mechanical geartrain via the plurality of power takeoff couplers. The radiator is fluidly coupled to the integrated cooling system, and the driveline and the drive member are mounted on the chassis.

Another aspect of the disclosure may include the driveline being arranged in one of a front drive configuration, a rear drive configuration, an all-wheel drive configuration, a four-wheel drive configuration, a four-wheel drive configuration including a power take-off arrangement, a tracked configuration, or a propeller configuration.

Another aspect of the disclosure may include the plurality of shaft members having a first shaft member and a second shaft member; wherein the first and second shaft members are arranged parallel to a longitudinal axis of the single housing, wherein a first of the plurality of power takeoff couplers is arranged on a first end of the single housing and is rotatably coupled to the first shaft member, and wherein a second of the plurality of power takeoff couplers is arranged on a second end of the single housing that is opposite to the first end along the longitudinal axis, and is rotatably coupled to the second shaft member.

Another aspect of the disclosure may include the first shaft member and the second shaft member being collinear, and being collinear with a centerline of the single housing.

Another aspect of the disclosure may include the power electronics system being an electric power inverter, an auxiliary power module, an accessory electric motor, an electric charge manager, and a power electronics controller.

Another aspect of the disclosure may include the power electronics controller being operatively connected to the electric power inverter, wherein the electric power inverter is configured to transfer electric power between the single electric machine and the rechargeable energy storage device.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
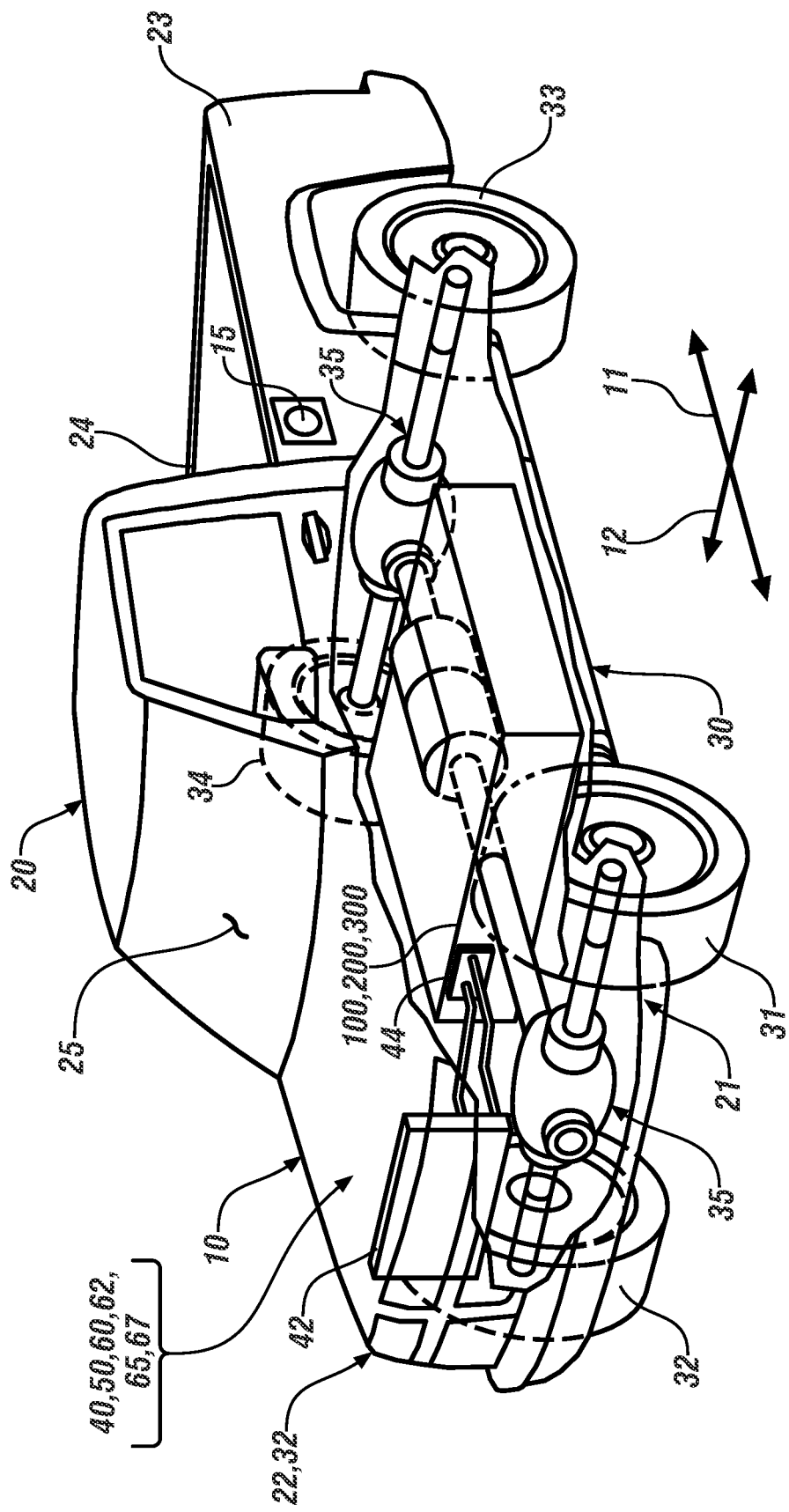
FIG. 1 pictorially illustrates an embodiment of a vehicle having an integrated electrified vehicle propulsion system (IEPS) arranged on a vehicle chassis, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

Furthermore, there is no intention to be bound by an expressed or implied theory presented in the preceding introduction and summary or the following detailed description. Throughout the drawings, corresponding reference numerals indicate like or corresponding parts and features.

As used herein, the term "system" refers to one of or a combination of mechanical and electrical actuators, sensors, controllers, application-specific integrated circuits (ASIC), combinatorial logic circuits, software, firmware, and/or other components that are arranged to provide the described functionality.

As used herein, the term "integrated propulsion system" and related terms are employed to refer to a modular arrangement that may be treated as a single component having one or multiple mechanical, electrical, communication, and fluidic connections. The integrated propulsion system may be readily adapted to assembly into a variety of chasses with minimal or no changes.

The use of ordinals such as first, second and third does not necessarily imply a ranked sense of order, but rather may distinguish between multiple instances of an act or structure.

Referring to the drawings, FIG. 1, consistent with embodiments disclosed herein, schematically illustrates a vehicle 10 that has an embodiment of an integrated electrified propulsion system (IEPS) 100 incorporated thereon. Details of one embodiment of the IEPS 100 are described with reference to FIG. 2. Other embodiments of IEPS 200, 300 are described and detailed with reference to FIGS. 3 and 4, respectively. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot, other wheeled vehicles, or other tracked vehicles to accomplish the purposes of this disclosure.

Referring again to FIG. 1, a non-limiting embodiment of the vehicle 10 includes a body 20 that is assembled onto a chassis 30, with an embodiment of the IEPS 100 incorporated into the chassis 30. The vehicle 10 defines a longitudinal axis 11 and a lateral axis 12. Advantageously, the IEPS 100 is incorporated into the chassis 30 between front and rear axles, and facilitates a single electric machine 115 to provide tractive power to the front and/or rear drivelines to achieve various drive modes.

The chassis 30 provides mounting and suspension components for supporting the body 20 on a plurality of drive members, or wheels in one embodiment, including a right front (RF) wheel 31, a left front (LF) wheel 32, a left rear (LR) wheel 33, and a right rear (RR) wheel 34 in one embodiment. The chassis 30 includes a plurality of driveline components 35 for transferring mechanical power between an embodiment of the IEPS 100 and the plurality of wheels, e.g., RF wheel 31, LF wheel 32, LR wheel 33, and RR wheel 34 in one embodiment.

The body 20 includes a plurality of corners, including RF corner 21, LF corner 22, LR corner 23, and RR corner 24, which are designed to accommodate a corresponding one of the plurality of wheels, e.g., RF wheel 31, LF wheel 32, LR wheel 33, and RR wheel 34. The body 20 also includes a passenger compartment 25. A charge access port 15 is disposed on a surface of the body 20, and is electrically connected to the IEPS 100 via high-voltage electrical cables. This is illustrated with reference to FIGS. 2, 3, and 4.

Referring again to FIG. 1, the driveline components 35 include, but are not limited to driveshafts, half-shafts, wheel mounts, wheel spindles, brakes, differentials, constant velocity joints, drive members, etc. The driveline components 35 are arranged with tractive power being delivered to the drive members or wheels in one of a front drive configuration, a rear drive configuration, an all-wheel drive configuration, a four-wheel drive configuration, a four-wheel drive configuration including a power take-off arrangement. In one embodiment, the drive members are arranged as a continuous track, with the drive member being a spur gear. In one embodiment, the drive member is arranged as a propeller, when the vehicle is a motor craft or an aircraft.

The heat management system 40 is arranged on the vehicle 10, and includes a fluidic circuit that includes a fluid/air heat exchanger (radiator) 42 and associated fluidic plumbing members that fluidly couple to the IEPS 100 at a connector 44. This is illustrated with reference to FIGS. 2, 3, and 4.

A plurality of low-voltage electrical accessories 60 are arranged on-vehicle, including, e.g., lighting, windows, seats, climate control fans, navigation, infotainment, etc., and are electrically powered via power that is derived from a rechargeable energy storage device (RESS) 110 via the auxiliary power module 124 via a low-voltage power bus connector 160, as illustrated with reference to FIG. 2.

A heating, ventilation and air conditioning (HVAC) system 50 is arranged to manage the environment of the cabin 25, with AC being powered via an accessory power motor 126 via port 170, as illustrated with reference to FIG. 2.

A vehicle controller 62 is arranged to control operation of various systems of the vehicle 10 in response to operator commands and other parameters, and is in communication with the IEPS 100 via communication bus 65, communication bus 165, and connector 166, as illustrated with reference to FIG. 2.

A telematics system 67 is arranged to provide communication between the vehicle 10 and other systems.

This arrangement facilitates ready incorporation of an embodiment of the IEPS 100 into a chassis and vehicle body with minimal connections for HVAC, cooling, etc.

This arrangement facilitates ready adaptation of an embodiment of the IEPS 100 into one of multiple body, chassis, and driveline configurations with minimal quantity of interconnections.

This arrangement facilitates flexible arrangement of an embodiment of the IEPS 100 into multiple body, chassis, and driveline configurations with minimal quantity of interconnections.

Figure 2:
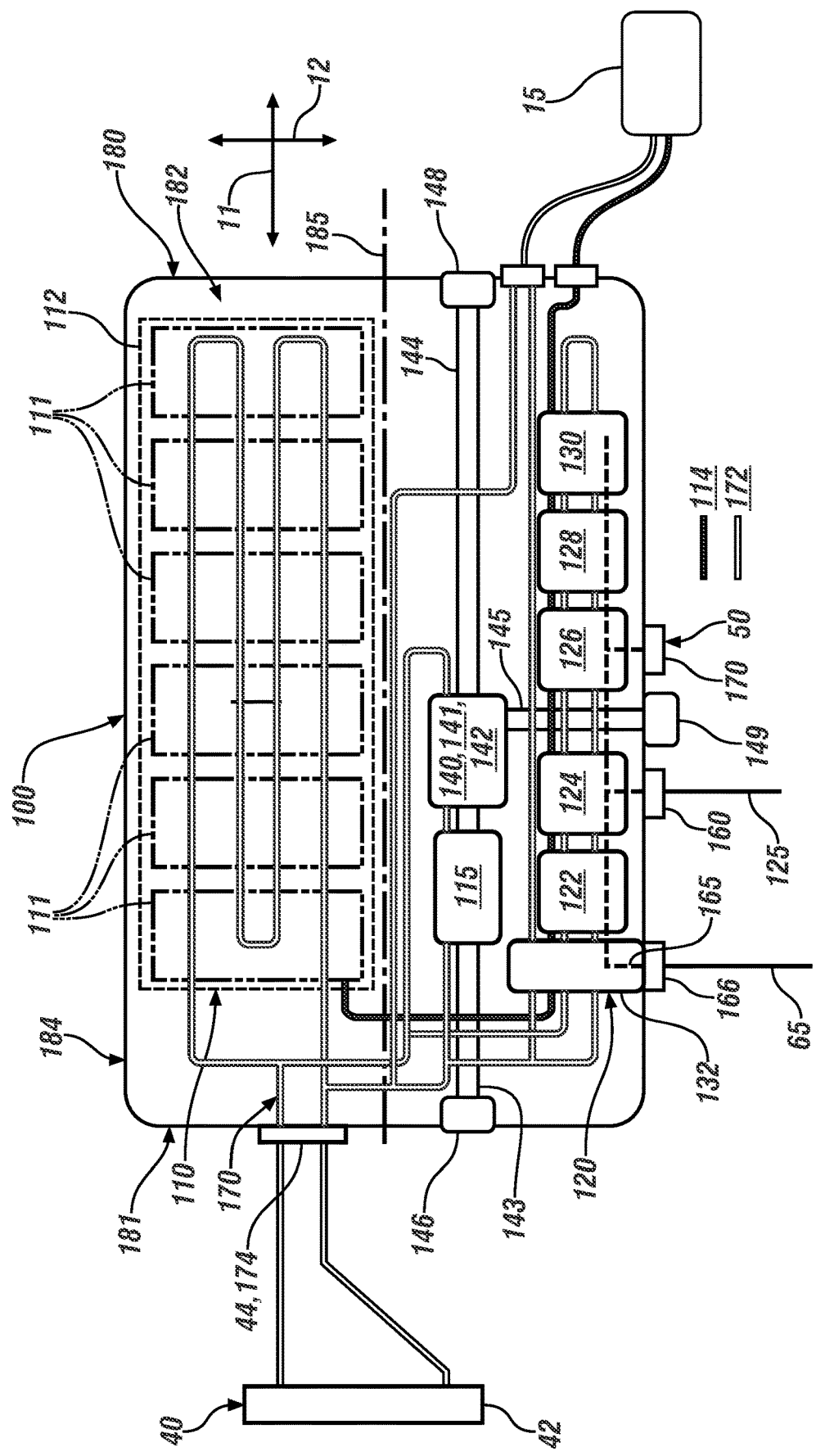
FIG. 2 schematically illustrates one embodiment of an integrated electrified vehicle propulsion system (IEPS) that can be integrated onto a vehicle chassis, in accordance with the disclosure.

FIG. 2 schematically illustrates one embodiment of the integrated electrified propulsion system (IEPS) 100, which includes a single electric machine 115, a mechanical geartrain 140, RESS 110, an integrated cooling system 170, and a power electronics system 120, wherein the single electric machine 115, the mechanical geartrain 140, the integrated cooling system 170, the RESS 110, and the power electronics system 120 are packaged and arranged in a housing 180.

This arrangement enables a centralized, consolidated layout of components, is readily adaptable to various vehicle platforms without modification or with minimal modifications, and may reduce mass, part count, wiring harness complexity, vehicle assembly time, and serviceability.

The housing 180 is composed as an assembled prismatic-shaped device that includes a first end 181 arranged towards a front portion, a second end 182 arranged towards a rear portion, a first side 183, and a second side 184, a top portion, and a bottom portion. The first and second ends 181, 182 are arranged parallel to the longitudinal axis 11, and the first and second sides 183, 184 are arranged parallel to the lateral axis 12. A centerline 185 is defined along the longitudinal axis laterally midway between the first and second sides 183, 184.

The single electric machine 115 is a high-voltage multiphase rotary electric motor/generator having an output shaft that is rotatably coupled to the mechanical geartrain 140, and is capable of providing all tractive effort for vehicle propulsion. The single electric machine 115 is configured to convert stored electric energy to mechanical power and convert mechanical power to electric energy that may be transferred to and stored in the RESS 110.

The RESS 110 is a high-voltage energy storage device, e.g., a multi-cell lithium ion device, which is composed as a plurality of interconnected battery cells 111. In this embodiment, the plurality of battery cells 111 are housed within a single container 112 and arranged on one side of the housing 180.

The RESS 110 may electrically connect via charge access port 15 to a remote, off-vehicle electric power source to perform electrical charging while the vehicle 10 is stationary. The RESS 110 electrically connects to an electric power inverter 122 via the high-voltage power bus 114 to transfer high-voltage DC electric power via three-phase conductors to the single electric machine 115 in response to control signals originating in the power electronics controller 132.

The mechanical geartrain 140 includes a gearset 141 that couples via a plurality of shaft members to a plurality of power takeoff (PTO) couplers. In one embodiment, the gearset 141 includes a torque transmission device 142 in the form of a multi-step fixed gear transmission device. Alternatively, the gearset 141 may include one or more planetary gears, one or more differential gears, or another arrangement. The geartrain 140 also includes other gearsets, shafts, clutches, bearings, couplers, and other devices to transfer mechanical power. The plurality of PTO couplers includes a front PTO coupler 146, a rear PTO coupler 148 that is opposite to the front PTO coupler 146, and in one embodiment, a side PTO coupler 149. The plurality of shaft members includes, in one embodiment and as shown, a first shaft 143 that is parallel to the longitudinal axis 11 and coupled to the front PTO coupler 146, a second shaft 144 that is parallel to the longitudinal axis 11 and coupled to the rear PTO coupler 148, and a third shaft 145 that is parallel to the lateral axis 12 and coupled to the side PTO coupler 149. In this embodiment, the first and second shafts 143, 144 are collinear and are laterally offset from the centerline 185.

The plurality of PTO couplers are configured to couple with corresponding driveline components 35 for transferring mechanical power between the IEPS 100 and one or more of the plurality of wheels, e.g., RF wheel 31, LF wheel 32, LR wheel 33, and RR wheel 34, to operate the vehicle in one or more of the front drive configuration, the rear drive configuration, an all-wheel drive configuration, the four-wheel drive configuration, the four-wheel drive configuration including the power take-off arrangement, the tracked configuration, or the propeller configuration, depending upon the arrangement of the driveline and chassis.

Referring again to FIG. 2, the integrated cooling system 170 is a heat management circuit that includes a fluidic circuit 172 that is arranged in the housing 180, with pipes, couplers, and a plurality of heat exchange elements that are coupled to various elements to remove or otherwise manage heat transfer. The fluidic circuit 172 includes a fluidic coupler 174 that is configured to fluidically connect to the connector 44 of the heat management system 40 via a single fluidic input and a single fluidic output. In one embodiment, the fluidic circuit 172 is arranged to circulate coolant to the RESS 110, the power electronics system 120, etc., to remove heat therefrom.

The power electronics system 120 includes the electric power inverter 122, an auxiliary power module 124, an accessory electric motor 126, an electric charge manager 128, battery charging manager 130, and a power electronics controller 132, which communicate via communication bus 165. The communication bus 165 includes bus connector 166, through which the communication bus 165 connects to and communicates with the vehicle communication bus 65.

The power electronics controller 132 includes executable software, algorithms, calibrations, etc., to monitor, oversee, control, and otherwise manage operations of the electric power inverter 122, auxiliary power module 124, accessory electric motor 126, electric charge manager 128, and battery charging manager 130. The power electronics controller 132 communicates with the vehicle controller 62 described with reference to FIG. 1 via communication bus 65 and communication bus 165 to receive control commands for the IEPS 100 and communicate operating parameters of the IEPS 100 to the vehicle controller 62.

Referring again to FIG. 2, the electric power inverter 122 includes power transistors that are complementary-paired and electrically connected in series across positive and negative branches of the high-voltage power bus 114. The power transistors transform high-voltage DC electric power to high-voltage AC electric power and transform high-voltage AC electric power to high-voltage DC electric power. The electric power inverter 122 employs pulsewidth-modulating (PWM) control of the power transistors to convert stored DC electric power originating in the RESS 110 to AC electric power to drive the single electric machine 115 to generate torque. Similarly, the electric power inverter 122 converts mechanical power transferred to the single electric machine 115 to DC electric power to generate electric energy that is storable in the RESS 110, including as part of a regenerative braking control strategy. The electric power inverter 122 receives motor control commands from the on-vehicle controller 62 via the communication bus 65, and controls inverter states to provide the motor drive and regenerative braking functionality from the on-vehicle controller 62 that is described with reference to FIG. 1.

Referring again to FIG. 2, the APM 124 is a step-down inverter that converts high-voltage DC electric power supplied from the RESS 110 via the high-voltage power bus 114 to low-voltage electric power that is output to a low-voltage power bus 125 via low-voltage connector 160. The low-voltage power bus 125 may supply low-voltage electric power to on-vehicle systems such as an infotainment system, a navigation system, vehicle lighting, accessories, the on-vehicle controller 62, other controllers, actuators and sensors, etc.

Referring again to FIG. 2, the accessory electric motor 126 is a single-phase or multi-phase electric motor that generates mechanical power that can be transferred to an on-vehicle device. In one embodiment, the accessory electric motor 126 is part of an electrically-powered air-conditioning (eAC) compressor of the HVAC system 50 that couples via connector 150 to the chassis 30.

Referring again to FIG. 2, the electric charge manager 128 is a controller that is arranged to monitor and control charging and discharging of the RESS 110.

The battery charging manager 130 is a controller that is arranged to monitor and control power flow from an off-board external power source that connects to the charge access port 15. The battery charging manager 130 manages power flow from an off-board external power source to effect electrical charging of the RESS 110, such as when the vehicle is stationary.

Figure 3:
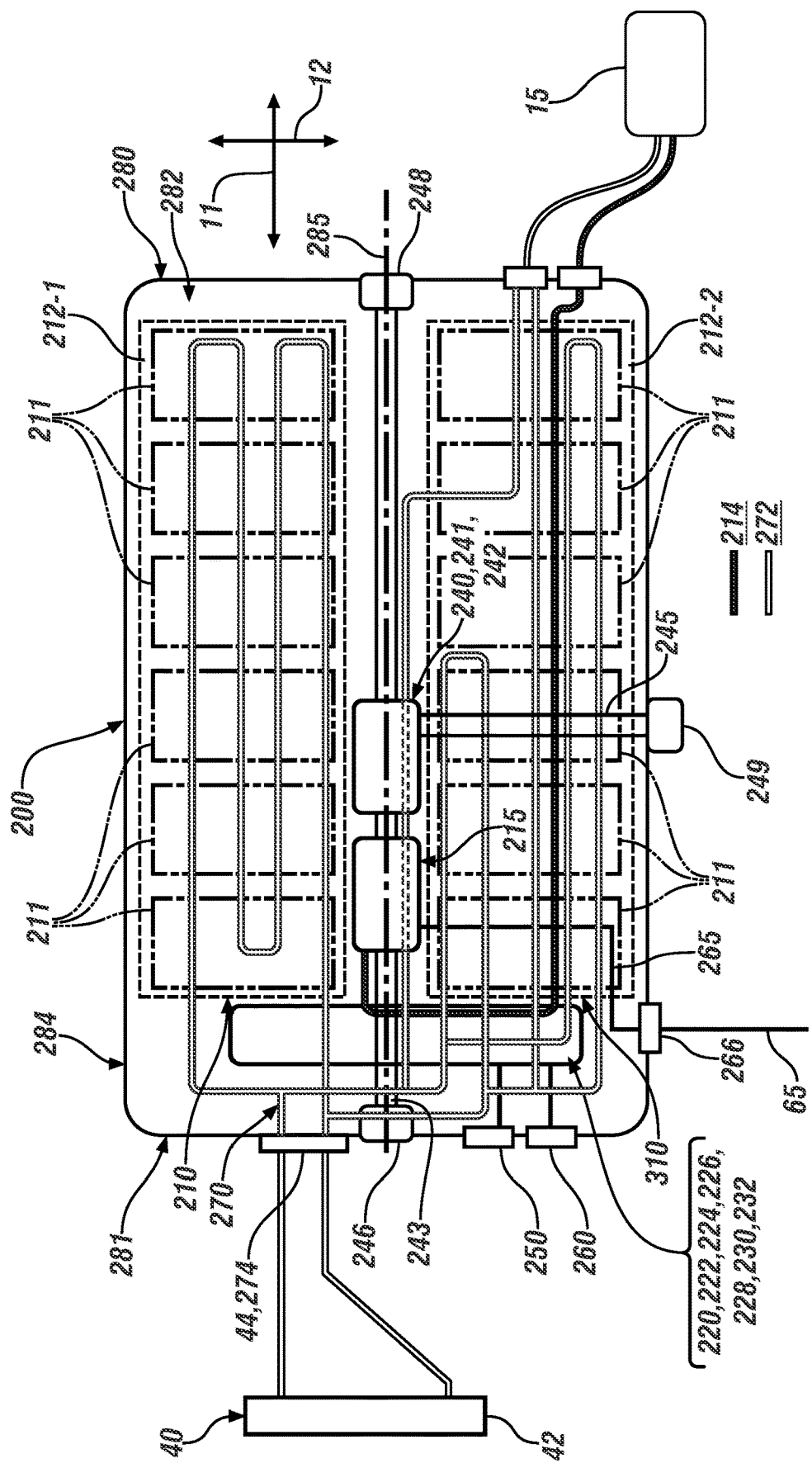
FIG. 3 schematically illustrates another embodiment of an integrated electrified vehicle propulsion system (IEPS) that can be integrated onto a vehicle chassis, in accordance with the disclosure.

FIG. 3 schematically illustrates another embodiment of the integrated electrified propulsion system (IEPS) 200, which includes the single electric machine 215, mechanical geartrain 240, rechargeable energy storage device (RESS) 210, integrated cooling system 270, and power electronics system 220, wherein the single electric machine 215, the mechanical geartrain 240, the integrated cooling system 270, the RESS 210, and the power electronics system 220 are packaged and arranged in housing 280.

Many elements of this arrangement are analogous to the embodiment described with reference to FIG. 2.

The housing 280 is composed as an assembled prismatic-shaped device that includes a first end 281 arranged towards a front portion, a second end 282 arranged towards a rear portion, a first side 283, and a second side 284, a top portion, and a bottom portion. The first and second ends 281, 282 are arranged parallel to the longitudinal axis 11, and the first and second sides 283, 284 are arranged parallel to the lateral axis 12. A centerline 285 is defined along the longitudinal axis laterally midway between the first and second sides 283, 284.

The single electric machine 215 is a high-voltage multi-phase rotary electric motor/generator having an output shaft that is rotatably coupled to the mechanical geartrain 240, and is capable of providing all tractive effort for vehicle propulsion. The single electric machine 215 is configured to convert stored electric energy to mechanical power and convert mechanical power to electric energy that may be transferred to and stored in the RESS 210.

The RESS 210 is a high-voltage energy storage device, e.g., a multi-cell lithium ion device, which is composed as a plurality of battery cells 211. In this embodiment, the plurality of battery cells 211 are housed within a first container 212-1 and a second container 212-2, which are arranged on opposed sides of the housing 180.

The RESS 210 may electrically connect via charge access port 15 to a remote, off-vehicle electric power source to perform electrical charging while the vehicle 10 is stationary. The RESS 210 electrically connects to an electric power inverter 222 via the high-voltage power bus 214 to transfer high-voltage DC electric power via three-phase conductors to the single electric machine 215 in response to control signals originating in the power electronics controller 232.

The mechanical geartrain 240 includes a gearset 241 that couples via a plurality of shaft members to a plurality of power takeoff (PTO) couplers. In one embodiment, the gearset 241 includes a torque transmission device 242 in the form of a multi-step fixed gear transmission device. Alternatively, the gearset 241 may include one or more planetary gears, one or more differential gears, or another arrangement. The geartrain 240 also includes other gearsets, shafts, clutches, bearings, couplers, and other devices to transfer mechanical power. The plurality of PTO couplers includes a front PTO coupler 246, a rear PTO coupler 248 that is opposite to the front PTO coupler 246, and in one embodiment, a side PTO coupler 249. The plurality of shaft members includes, in one embodiment and as shown, a first shaft 243 that is parallel to the longitudinal axis 11 and coupled to the front PTO coupler 246, a second shaft 244 that is parallel to the longitudinal axis 11 and coupled to the rear PTO coupler 248, and a third shaft 245 that is parallel to the lateral axis 12 and coupled to the side PTO coupler 249. In this embodiment, the first and second shafts 243, 244 are collinear and are collinear with the centerline 285.

The plurality of PTO couplers are configured to couple with corresponding driveline components 35 for transferring mechanical power between the IEPS 200 and one or more of the plurality of wheels, e.g., RF wheel 31, LF wheel 32, LR wheel 33, and RR wheel 34.

Referring again to FIG. 3, the integrated cooling system 270 is a heat management circuit that includes a fluidic circuit 272 that is arranged in the housing 280, with pipes, couplers, and a plurality of heat exchange elements that are coupled to various elements to remove or otherwise manage heat transfer. The fluidic circuit 272 includes a fluidic coupler 274 that is configured to fluidically connect to the connector 44 of the heat management system 40. In one embodiment, the fluidic circuit 272 is arranged to circulate coolant to the RES S 210, the power electronics system 220, etc., to remove heat therefrom.

The power electronics system 220 includes the electric power inverter 222, an auxiliary power module 224, an accessory electric motor 226, an electric charge manager 228, battery charging manager 230, and power electronics controller 232, which communicate via a communication bus 265. The communication bus 265 includes a bus connector 266, through which the communication bus 265 connects to and communicates with the vehicle communication bus 65. In this embodiment, the elements of the power electronics system 220 are arranged to be parallel to the lateral axis 12 and towards the front of the container 200 so as to effect ready connection to the battery cell housings in containers 212-1 and 212-2.

The arrangement and functions of the electric power inverter 222, the APM 224, the accessory electric motor 226, the electric charge manager 228, the battery charge manager 230, and the power electronics controller 232 are analogous to the corresponding devices described with reference to FIG. 2.

The power electronics controller 232 communicates via a communication bus 265. The communication bus 265 includes a bus connector 266, through which the communication bus 265 connects to and communicates with the vehicle communication bus 65.

The power electronics controller 232 includes executable software, algorithms, calibrations, etc. to monitor, oversee, control, and otherwise manage operations of the electric power inverter 222, auxiliary power module 224, accessory electric motor 226, electric charge manager 228, and battery charging manager 230. The power electronics controller 232 communicates with the vehicle controller 62 described with reference to FIG. 1 via communication bus 65 and communication bus 265 to receive control commands for the IEPS 200 and communicate operating parameters of the IEPS 200 to the vehicle controller 62.

Figure 4:
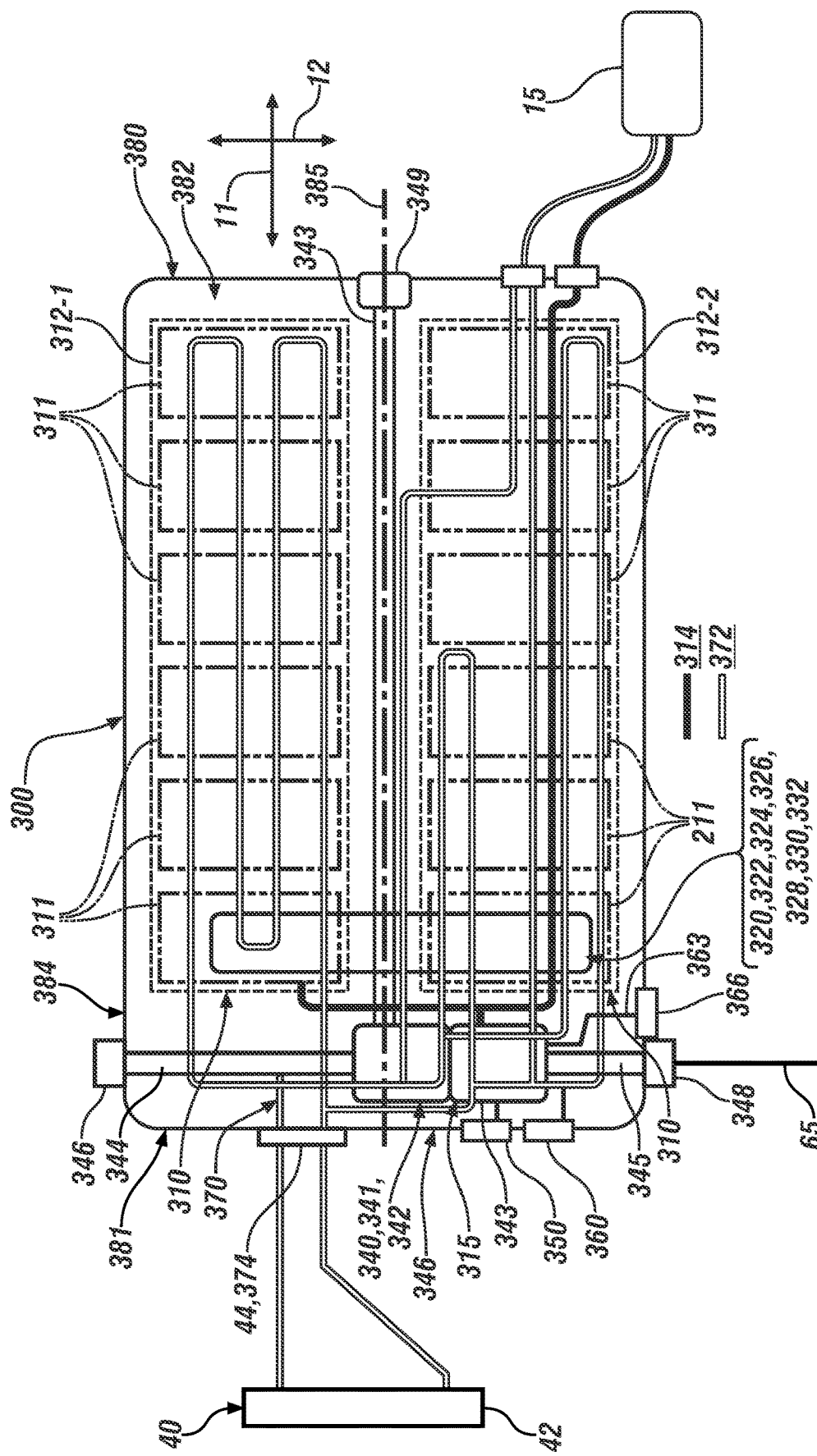
FIG. 4 schematically illustrates another embodiment of an integrated electrified vehicle propulsion system (IEPS) that can be integrated onto a vehicle chassis, in accordance with the disclosure.

FIG. 4 schematically illustrates another embodiment of the integrated electrified propulsion system (IEPS) 300, which includes the single electric machine 315, mechanical geartrain 340, rechargeable energy storage device (RESS) 310, integrated cooling system 370, and power electronics system 320, wherein the single electric machine 315, the mechanical geartrain 340, the integrated cooling system 370, the RESS 310, and the power electronics system 320 are packaged and arranged in housing 380.

Many elements of this arrangement are analogous to the embodiment described with reference to FIG. 3.

The housing 380 is composed as an assembled prismatic-shaped device that includes a first end 381 arranged towards a front portion, a second end 382 arranged towards a rear portion, a first side 383, and a second side 384, a top portion, and a bottom portion. The first and second ends 381, 382 are arranged parallel to the longitudinal axis 11, and the first and second sides 383, 384 are arranged parallel to the lateral axis 12. A centerline 385 is defined along the longitudinal axis laterally midway between the first and second sides 383, 384.

The single electric machine 315 is a high-voltage multi-phase rotary electric motor/generator having an output shaft that is rotatably coupled to the mechanical geartrain 340, and is capable of providing all tractive effort for vehicle propulsion. The single electric machine 315 is configured to convert stored electric energy to mechanical power and convert mechanical power to electric energy that may be transferred to and stored in the RESS 310.

The RESS 310 is a high-voltage energy storage device, e.g., a multi-cell lithium ion device, which is composed as a plurality of battery cells 311. In this embodiment, the plurality of battery cells 311 are housed within a first container 312-1 and a second container 312-2, which are arranged on opposed sides of the housing 380.

The RESS 310 may electrically connect via charge access port 15 to a remote, off-vehicle electric power source to perform electrical charging while the vehicle 10 is stationary. The RESS 310 electrically connects to an electric power inverter 322 via the high-voltage power bus 314 to transfer high-voltage DC electric power via three-phase conductors to the single electric machine 315 in response to control signals originating in the power electronics controller 332.

The power electronics controller 332 communicates via a communication bus 365. The communication bus 365 includes a bus connector 366, through which the communication bus 365 connects to and communicates with the vehicle communication bus 65.

The power electronics controller 332 includes executable software, algorithms, calibrations, etc. to monitor, oversee, control, and otherwise manage operations of the electric power inverter 322, auxiliary power module 324, accessory electric motor 326, electric charge manager 328, and battery charging manager 330. The power electronics controller 332 communicates with the vehicle controller 62 described with reference to FIG. 1 via communication bus 65 and communication bus 365 to receive control commands for the IEPS 300 and communicate operating parameters of the IEPS 300 to the vehicle controller 62.

The mechanical geartrain 340 includes a gearset 341 that couples via a plurality of shaft members to a plurality of power takeoff (PTO) couplers. In one embodiment, the gearset 341 includes a torque transmission device 342 in the form of a multi-step fixed gear transmission device. Alternatively, the gearset 341 may include one or more planetary gears, one or more differential gears, or another arrangement. The geartrain 340 also includes other gearsets, shafts, clutches, bearings, couplers, and other devices to transfer mechanical power. The plurality of PTO couplers includes a left front PTO coupler 346, a right front PTO coupler 348 that is opposite to the front PTO coupler 346, and in one embodiment, a rear PTO coupler 349. The plurality of shaft members includes, in one embodiment and as shown, a first shaft 343 that is parallel to the longitudinal axis 11 and coupled to the rear PTO coupler 349, a second shaft 344 that is parallel to the lateral axis 12 and coupled to the left front PTO coupler 346, and a third shaft 345 that is parallel to the lateral axis 12 and coupled to the right front PTO coupler 348. In this embodiment, the first and second shafts 343, 344 are collinear, are orthogonal to the centerline 385, and form the front axle. The third shaft 345 is collinear with the center line 385, with the rear PTO coupler 349 at the rear of the device.

The plurality of PTO couplers are configured to couple with corresponding driveline components 35 for transferring mechanical power between the IEPS 300 and one or more of the plurality of wheels, e.g., RF wheel 31, LF wheel 32, LR wheel 33, and RR wheel 34.

Referring again to FIG. 3, the integrated cooling system 370 is a heat management circuit that includes a fluidic circuit 372 that is arranged in the housing 380, with pipes, couplers, and a plurality of heat exchange elements that are coupled to various elements to remove or otherwise manage heat transfer. The fluidic circuit 374 includes a fluidic coupler 374 that is configured to fluidically connect to the connector 44 of the heat management system 40. In one embodiment, the fluidic circuit 372 is arranged to circulate coolant to the RES S 310, the power electronics system 320, etc., to remove heat therefrom.

The power electronics system 320 includes the electric power inverter 322, an auxiliary power module 324, an accessory electric motor 326, an electric charge manager 328, battery charging manager 330, and a power electronics controller 332, which communicate via a communication bus 365. The communication bus 365 includes a bus connector 366, through which the communication bus 365 connects to and communicates with the vehicle communication bus 65. In this embodiment, the elements of the power electronics system 320 are arranged to be parallel to the lateral axis 12 and towards the front of the container 300 so as to effect ready connection to the battery cell housings in containers 312-1 and 312-2.

The arrangement and functions of the electric power inverter 322, the APM 324, the accessory electric motor 326, the electric charge manager 328, the battery charge manager 330, and the power electronics controller 332 are analogous to the corresponding devices described with reference to FIG. 2.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, e.g., communication buses 65 and 165, a wireless link (e.g., WiFi, LiFi, etc.), or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, which is capable of traveling through a medium.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. An integrated electrified propulsion system for a vehicle, comprising:
 a single electric machine; a mechanical geartrain; a rechargeable energy storage device;
 an integrated cooling system; and a power electronics system;
 wherein the single electric machine, the mechanical geartrain, the integrated cooling system, the rechargeable energy storage device, and the power electronics system are arranged in a single housing;
 wherein the single electric machine is rotatably coupled to the mechanical geartrain to transfer mechanical power therebetween; and
 wherein the mechanical geartrain comprises a torque transmission device coupled to a plurality of power takeoff couplers via a plurality of shaft members.

2. The integrated electrified propulsion system of claim 1:
 wherein the plurality of shaft members includes a first shaft member and a second shaft member;
 wherein the first and second shaft members are arranged perpendicular to a longitudinal axis of the single housing;
 wherein a first of the plurality of power takeoff couplers is arranged on a first side of the single housing and is rotatably coupled to the first shaft member; and
 wherein a second of the plurality of power takeoff couplers is arranged on a second side of the single housing that is opposite to the first side perpendicular to the longitudinal axis, and is rotatably coupled to the second shaft member.

3. The integrated electrified propulsion system of claim 1:
wherein the plurality of shaft members includes a first shaft member and a second shaft member;
wherein the first and second shaft members are arranged parallel to a longitudinal axis of the single housing;
wherein a first of the plurality of power takeoff couplers is arranged on a first end of the single housing and is rotatably coupled to the first shaft member; and
wherein a second of the plurality of power takeoff couplers is arranged on a second end of the single housing that is opposite to the first end along the longitudinal axis, and is rotatably coupled to the second shaft member.

4. The integrated electrified propulsion system of claim 3, wherein the first shaft member and the second shaft member are collinear, and are collinear with a centerline of the single housing.

5. The integrated electrified propulsion system of claim 3, wherein the first shaft member and the second shaft member are collinear, and are laterally offset from a centerline of the single housing.

6. The integrated electrified propulsion system of claim 1, wherein the single electric machine comprises a multi-phase rotary electric motor/generator.

7. The integrated electrified propulsion system of claim 1, wherein the power electronics system comprises an electric power inverter, an auxiliary power module, an accessory electric motor, an electric charge manager, and a power electronics controller.

8. The integrated electrified propulsion system of claim 7, wherein the power electronics controller is operatively connected to the electric power inverter, and wherein the electric power inverter is configured to transfer electric power between the single electric machine and the rechargeable energy storage device.

9. The integrated electrified propulsion system of claim 7, wherein the accessory electric motor is coupled to an air-conditioning (AC) compressor.

10. The integrated electrified propulsion system of claim 1, further comprising a high-voltage power bus, wherein the high-voltage power bus is configured to transfer electric power between the rechargeable energy storage device and the power electronics system.

11. The integrated electrified propulsion system of claim 1, wherein the rechargeable energy storage device is disposed in a separate battery housing that is arranged within the single housing.

12. The integrated electrified propulsion system of claim 1, wherein the integrated cooling system includes a fluidic circuit that is thermally coupled to at least one of the single electric machine, the mechanical geartrain, the rechargeable energy storage device, and the power electronics system via a plurality of fluidic heat exchange devices.

13. An electrified vehicle, comprising:
a chassis, a radiator, a driveline coupled to a drive member, a charger port, and an integrated electrified propulsion system,
wherein the integrated electrified propulsion system is assembled into the chassis;
wherein the integrated electrified propulsion system includes a single electric machine, a mechanical geartrain, a rechargeable energy storage device, an integrated cooling system, and a power electronics system, wherein the single electric machine, the mechanical geartrain, the integrated cooling system, the rechargeable energy storage device, and the power electronics system are arranged in a single housing;
wherein the single electric machine is rotatably coupled to the mechanical geartrain to transfer mechanical power therebetween;
wherein the mechanical geartrain comprises a torque transmission device coupled to a plurality of power takeoff couplers via a plurality of shaft members;
wherein the driveline is mechanically coupled to the mechanical geartrain via the plurality of power takeoff couplers;
wherein the radiator is fluidly coupled to the integrated cooling system; and
wherein the driveline and the drive member are mounted on the chassis.

14. The electrified vehicle of claim 13, wherein the driveline is arranged in one of a front drive configuration, a rear drive configuration, an all-wheel drive configuration, a four-wheel drive configuration, a four-wheel drive configuration including a power take-off arrangement, a tracked configuration, or a propeller configuration.

15. The electrified vehicle of claim 13, wherein the plurality of shaft members includes a first shaft member and a second shaft member; wherein the first and second shaft members are arranged parallel to a longitudinal axis of the single housing, wherein a first of the plurality of power takeoff couplers is arranged on a first end of the single housing and is rotatably coupled to the first shaft member, and wherein a second of the plurality of power takeoff couplers is arranged on a second end of the single housing that is opposite to the first end along the longitudinal axis, and is rotatably coupled to the second shaft member.

16. The electrified vehicle of claim 13, wherein the power electronics system comprises an electric power inverter, an auxiliary power module, an accessory electric motor, an electric charge manager, and a power electronics controller.

17. The electrified vehicle of claim 16, wherein the power electronics controller is operatively connected to the electric power inverter, and wherein the electric power inverter is configured to transfer electric power between the single electric machine and the rechargeable energy storage device.

18. An integrated electrified propulsion system for a vehicle, consisting of:
a single multi-phase rotary electric motor/generator; a mechanical geartrain; a rechargeable energy storage device; an integrated cooling system; a single housing; and a power electronics system;
wherein the single multi-phase rotary electric motor/generator, the mechanical geartrain, the integrated cooling system, the rechargeable energy storage device, and the power electronics system are arranged in the single housing;
wherein the single multi-phase rotary electric motor/generator is rotatably coupled to the mechanical geartrain to transfer mechanical power therebetween; and
wherein the mechanical geartrain comprises a torque transmission device coupled to a plurality of power takeoff couplers via a plurality of shaft members.

19. The integrated electrified propulsion system of claim 18,
wherein the plurality of shaft members includes a first shaft member and a second shaft member; and
wherein the first shaft member and the second shaft member are collinear, and are collinear with a centerline of the single housing.

20. The integrated electrified propulsion system of claim 18,
    wherein the plurality of shaft members includes a first shaft member and a second shaft member; and
    wherein the first shaft member and the second shaft member are collinear, and are laterally offset from a centerline of the single housing.

* * * * *